(12) United States Patent
Ravindran et al.

(10) Patent No.: US 11,348,135 B1
(45) Date of Patent: May 31, 2022

(54) SYSTEMS AND METHODS OF USING REINFORCEMENT LEARNING FOR PROMOTIONS

(71) Applicant: THE BOSTON CONSULTING GROUP, INC., Boston (GB)

(72) Inventors: Arun Karthik Ravindran, Somerville, MA (US); Vincent Francois Faber, Brooklyn, NY (US); Victor Kostyuk, Boston, MA (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 0 days.

(21) Appl. No.: 16/204,321

(22) Filed: Nov. 29, 2018

Related U.S. Application Data

(60) Provisional application No. 62/744,508, filed on Oct. 11, 2018.

(51) Int. Cl.
*G06Q 30/02* (2012.01)
*G06N 20/00* (2019.01)

(52) U.S. Cl.
CPC ......... *G06Q 30/0244* (2013.01); *G06N 20/00* (2019.01)

(58) Field of Classification Search
CPC .............................................. G06Q 30/0244
USPC .................................................... 705/14.43
See application file for complete search history.

(56) References Cited

U.S. PATENT DOCUMENTS

| | | | |
|---|---|---|---|
| 7,827,060 B2 * | 11/2010 | Wright | G06Q 30/02 705/14.4 |
| 9,589,278 B1 | 3/2017 | Wang | |
| 2002/0062245 A1 * | 5/2002 | Niu | G06Q 30/02 705/14.51 |
| 2005/0071223 A1 * | 3/2005 | Jain | G06Q 30/02 705/14.13 |
| 2008/0249844 A1 * | 10/2008 | Abe | G06Q 10/06375 705/7.33 |
| 2019/0139092 A1 | 5/2019 | Nomula | |

OTHER PUBLICATIONS

Tejasophon, Pat. "Prepaid calling card online store." MS Thesis, Assumption University of Thailand, Jul. 2003, 106 pages. (Year: 2003).
Steindór Sæundsson, Katja Hofmann, Marc Peter Deisenroth, "Meta Reinforcement Learning with Latent Variable Gaussian Processes". arXiv:1803,07551 (Jul. 7, 2018), 11 pages. (Year: 2018).
Lohtia, R., N. Donthu, and I. Yaveroglu, "Evaluating the efficiency of Internet banner advertisements", J. Business Research 60, 2007, pp. 365-370, (Year: 2007).
Image File Wrapper of U.S. Appl. No. 17/114,226.

\* cited by examiner

*Primary Examiner* — Azam A Ansari
(74) *Attorney, Agent, or Firm* — DLA Piper LLP (US)

(57) ABSTRACT

Methods and systems for using reinforcement learning to optimizing promotions. A promotion for a product and/or service is offered to a customer using a reinforcement learning model. The customer's reaction is observed. A reward or a penalty is collected based on the customer's reaction. The reinforcement learning model is adapted based on the reward or penalty.

30 Claims, 4 Drawing Sheets

FIGURE 3: Reinforcement Learning Algorithm

Requires:
State space $S=\{s1, s2, ..., sN\}$
Actions space $A=\{\Phi 1, \Phi 2, ..., \Phi 3n\}$
Reward function $S \times S \times A \rightarrow \mathbb{R}$
Stochastic transition function $T: S \times A \rightarrow S$ (dictated by the customer behavior described in the framework above)
Learning rate $\alpha \in [0,1]$
Discounting factor $\gamma \in [0,1]$
Exploration factor $\epsilon \in [0,1]$
    Procedure QLearning($S, A, R, T, \alpha, \gamma, \epsilon$)
        Initialize $Q: S \times A \rightarrow \mathbb{R}$ to a zero matrix
        Start in state $s \in S$
        While $Q$ is not converged do
            If $U(0,1) < \epsilon$
                Choose action $a* \in A$ randomly
            Else
                Choose $a* = arg\,max\_a\, Q(s,a)$
            Compute the new state $s' \leftarrow T(s, a*)$
            Compute the reward $r \leftarrow R(s, s', a*)$
            Update the Q matrix: $Q(s,a) \leftarrow (1-\alpha)Q(s,a) + \alpha\,(r + \gamma\,max\_a'Q(s',a'))$
            Update state $s \leftarrow s'$
        Return Q

SYSTEMS AND METHODS OF USING REINFORCEMENT LEARNING FOR PROMOTIONS

CROSS-REFERENCE TO RELATED APPLICATIONS

This application claims the benefit of U.S. Provisional Application No. 62/744,508 filed Oct. 11, 2018, which is incorporated by reference in its entirety.

BRIEF DESCRIPTION OF THE FIGURES

FIG. 3 sets forth an example learning algorithm, according to an embodiment.

DESCRIPTION OF EMBODIMENTS OF THE INVENTION

In some embodiments, the behavior of a model, or learner, whose task is to maximize the efficiency of promotions and ads it is generating relative to a defined reward function can be optimized. In the context of promotions, the reward function can be defined, for example, to be the revenue net costs associated with the promotion. The learner can try to learn the probability distribution underlying the customer's purchasing behavior, and the effects of promotions on this distribution, in order to maximize expected long-term rewards and therefore profit.

Figure 1:
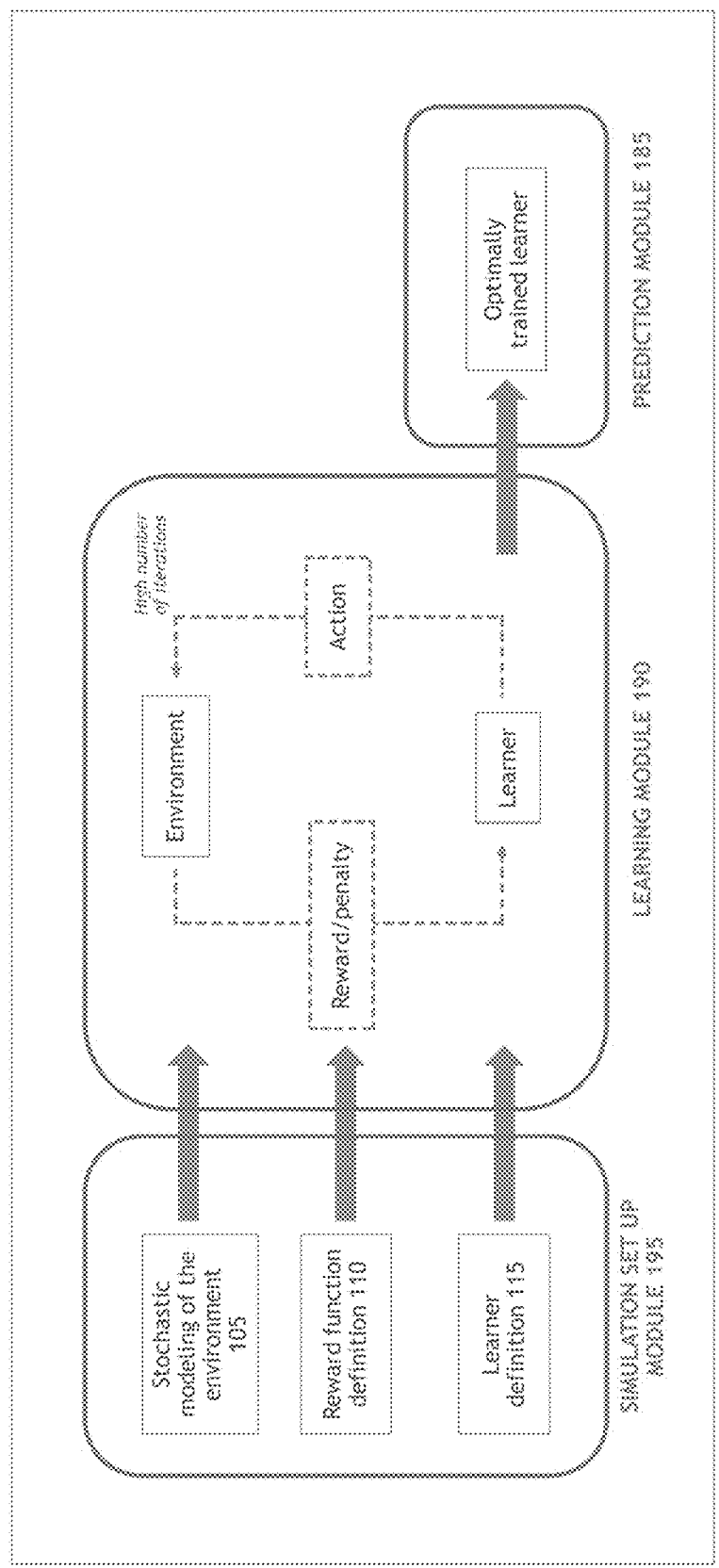
FIG. 1 illustrates a system for using reinforcement learning for promotions, according to an embodiment.

FIG. 1 illustrates a system for using reinforcement learning for promotions. A simulation set up module 195, a learning module 190, and a prediction module 185 can be utilized. The simulation set up module 195 can comprise stochastic modeling of the environment; a reward function definition, and a learner definition. The learning module 190 can comprise an action, an environment, a reward and/or penalty, and a learner. The prediction module 185 can comprise an optionally trained learner.

Figure 2:
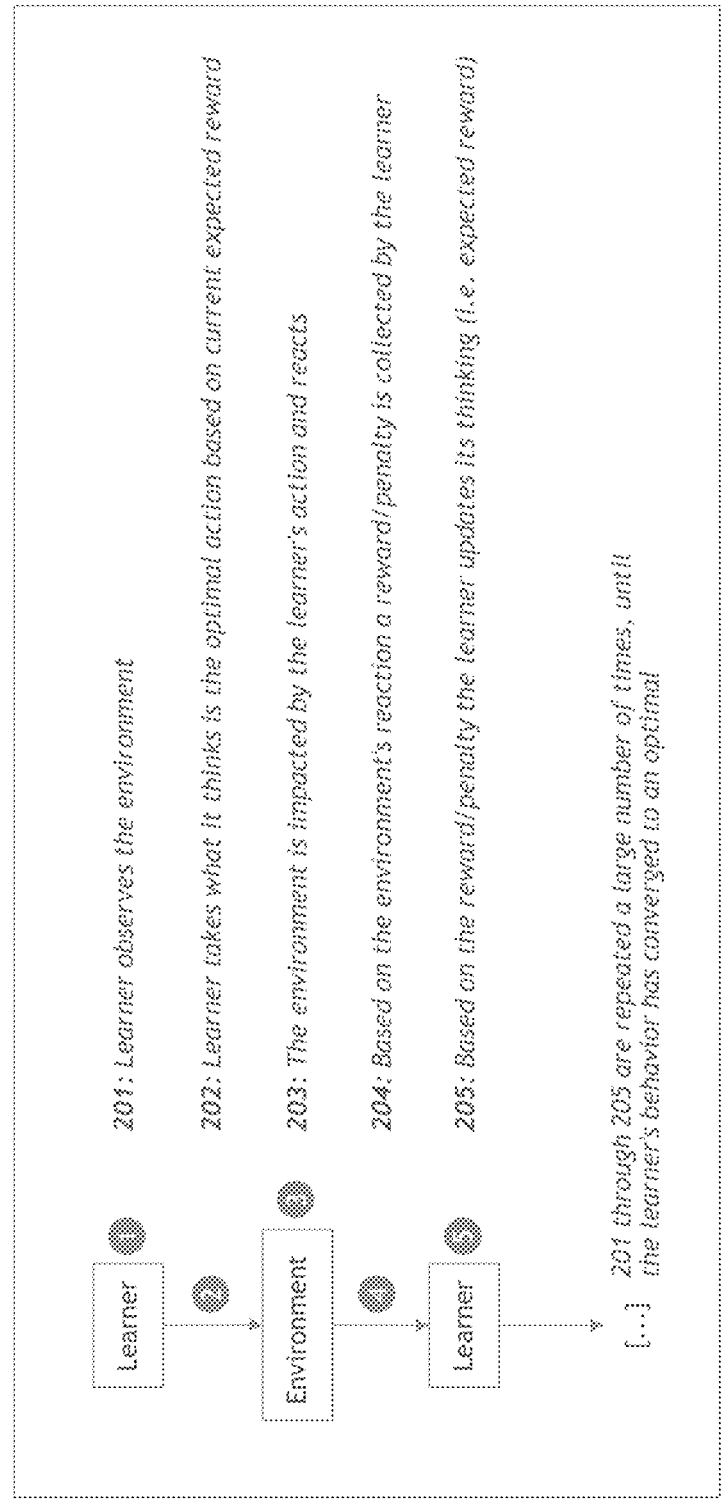
FIG. 2 illustrates a method for using reinforcement learning for promotions, according to an embodiment.

FIG. 2 illustrates a method for using reinforcement learning for promotions. In 201, a learner can observe an environment. In 202, the learner can determine and take an optional action (or multiple optimal actions), such as offering a discount or enabling a promotion, based on a current expected reward. In 203, the environment (e.g., a customer) can be impacted by the learner's action and reacts (e.g., a customer buys or does not buy a product based on a promotion). In 204, based on how the environment (e.g., customer) reacted to the action, the learner can collect a reward or a penalty. In 205, based on the reward or penalty, the learner can adapt it thinking accordingly (e.g., updates the reward or penalty). 1 thru 5 can be repeated a large number of times, until, for example, the learner's behavior has converged to an optimal behavior.

The method described herein can allow for ultra-personalization instead of relying on rough segmentation. It can be applied to optimize both discounts and non-discount promotions (e.g., recommendations, ads). A time dimension can be utilized so that the offer and the timing can be optimized. In addition, highly complex behavior can be learned by the reinforcement learning module. In some embodiments, training data and/or knowledge of the customer's historical buying activity is not required because the reinforcement learning model learns as it goes.

Example Framework

Consider a single customer facing a market with n products $p \in \{1, 2, \ldots, n\}$.

In some embodiments, we define the following variables as follows:

$T_p$: Maximum number of periods the customer can go without purchasing product p $\theta \in \mathbb{R}+$: Sensitivity of the customer to promotion/ads At each period, we define the following variables:

$t_p$: Current number of periods since the customer last purchased product p $s=[t_1, t_2, \ldots, t_n]$: the state the customer is currently in, in other word the number of periods that has passed since he last purchased each individual product p. Note that while the state in this model is the time since the last purchase (of each product), it doesn't have to be in general. It can include any changing property of a customer (e.g., a 0/1 value indicating if a customer has responded to a promotion in the last month, brand preference (if known), city of residence, etc.)

$\phi_p \in [0,1]$: variable indicating the strength of the promotion/ad for product p to the customer. In one embodiment, we can restrict $\phi_p$ to take values in $\{0, 0.1, 0.2\}$ in order to reduce the size of the state-action space. We can try to keep the model agnostic and general; in other words, we don't need to explicitly describe what type of promotion the model will try to generate (e.g. discount, promotion, bundling, ads, etc.) All that can matter is that the promotion has a cost associated to it, which increases as the strength of the promotion becomes larger. As its strength increases, so can its effects.

$a=[\phi_1, \phi_2, \ldots, \phi_n]$: the promotion vector, also called the action chosen by the model (e.g., what product to promote at this period)

At the beginning of any given period, the likelihood for the customer to purchase product p can follow a Bernoulli distribution with parameter:

$$\left(\frac{t_p}{T_p}\right)^{max(0, 1-\theta \times \phi_p)}$$

The above Bernoulli parameter can go to 1 as $t_p$ increases towards $T_p$. The exponent can be <1 when the model chooses $\phi_p > 0$ (e.g., generate a promotion for product p to a customer with a non-zero sensitivity $\theta > 0$). As soon as the exponent is <1, the overall value of the Bernoulli parameter can increase, making a purchase more likely.

Based on the customer's action, a state $s=[t_1, t_2, \ldots, t_n]$ can be updated to $s'=[t_1', t_2', \ldots, t_n']$ as follow:

For all $$p \in \{1, 2, \ldots, n\}, t_p' = \begin{cases} t_p + 1, & \text{if } p \text{ not bought} \\ 0, & \text{if } p \text{ bought} \end{cases}$$

Figure 4:
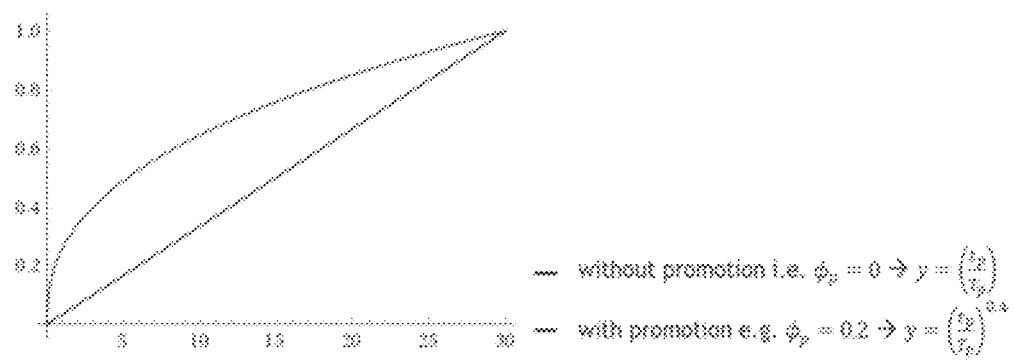
FIG. 4 sets forth an example graph illustrating how a promotion can impact the likelihood of a customer making a purchase of product, according to an embodiment.

FIG. 4 describes how the promotion is impacting the likelihood of the customer making purchase of product p as $t_p$ increase towards $T_p$ as the days pass. Here $T_p=30$ and $\theta=3$.

This distribution can (1) correspond to a consumption pattern of regularly consumed products (e.g., groceries, personal hygiene), and/or (2) impact the promotion (e.g., spread between the two curves) variant as $t_p$ varies, so we can anticipate a ground truth "optimal" promotion strategy in some embodiments. An optimal promotion strategy can comprise an optimal time and/or optimal promotion details based on a certain person.

Learning Via Penalties and Rewards

A Q-matrix can map each state $s \in S$ and each action $a \in A$ to a value representing the expected long-term reward of choosing a given action in a given state. Taking action $a \in A$ (e.g., offer discount for a single product but none for others) given a state $s \in S$ can push the system to a new state $s' \in S$ (e.g., the customer does not purchase promoted product) and the learner can collect a reward that is function of a, s and s'. Based on this reward (positive vs. negative) the learner can update its Q matrix.

The reward function can penalize the learner for making a bad and ineffective promotion, and can reward it in case of success. We can introduce a new parameter representing the profit made per sale, $\pi$. During testing, the function can be defined as follow:

$$R_{test(s,s',a^*)} = \pi \left( \sum_{p=1}^{n} 1_{t'_p=0} \right) - \left( \sum_{p=1}^{n} \phi_p^* \right)$$

where 1 is the indicator function, i.e.

$$1_{t'_p=0} = \begin{cases} 1 & \text{if } t'_p = 0 \\ 0 & \text{else} \end{cases}$$

in other words, $1_{t'_p=0}=1$ if and only if the customer purchases product p. The first term can represents the profit generated by moving from state s to state s' and the second term can be interpreted as the cost of choosing a promotion vector $a^*$.

During training, we can modify the above reward function with additional sticks and carrots in order to further incentivize the learner:

$$R_{train}(s, s', a^*) = \pi \left( \sum_{p=1}^{n} 1_{t'_p=0} \right) - \left( \sum_{p=1}^{n} \phi_p^* \right) + \left( \sum_{p=1}^{n} \phi_p^* \times 1_{t'_p=0} \right) - \left( \sum_{p=1}^{n} \phi_p^* \times 1_{t'_p \neq 0} \right)$$

The first two terms above can be similar to those of $R_{test}(s, s', a^*)$, but the third term can be $>0$ if the products that were promoted were also purchased (e.g., bonus) whereas the fourth term can be $>0$ if the products promoted were not purchased (e.g., malus).

Example Learning Algorithm

We can call the basic time unit corresponding to a single iteration of the algorithm a "day". If there are n products, each can either be promoted or not promoted on each day. Thus, there are a total of $3^n$ possible actions (i.e. $3^n$ possible promotion vector $a=[\phi_1, \phi_2, \ldots, \phi_n]$, since in our specific implementation $\phi_p$ takes value in $\{0, 0.1, 0.2\}$ and a total $N=\Pi_{p=1}^{n}(T_p+1)$ possible states.

The learning algorithm (also set forth in FIG. 3) learns over time how to adapt, and can be described in some embodiments as follows:

Requires:
State space $S=\{s_1, s_2, \ldots, s_N\}$
Actions space $A=\{\Phi_1, \Phi_2, \ldots, \Phi_{3^n}\}$
Reward function R: $S \times S \times A \to \mathbb{R}$
Stochastic transition function T: $S \times A \to S$ (dictated by the customer behavior described in the framework above)
Learning rate $\alpha \in [0,1]$
Discounting factor $\gamma \in [0,1]$
Exploration factor $\epsilon \in [0,1]$
  Procedure QLearning(S, A, R, T, $\alpha$, $\gamma$, $\epsilon$)
  Initialize Q: $S \times A \to \mathbb{R}$ to a zero matrix
  Start in state $s \in S$

---

While Q is not converged do
  If $U(0,1) < \epsilon$
    Choose action $a^* \in A$ randomly
  Else
    Choose $a^* = \underset{a}{\operatorname{argmax}} Q(s, a)$
  Compute the new state $s' \leftarrow T(s, a^*)$
  Compute the reward $r \leftarrow R(s, s', a^*)$
  Update the Q matrix:
  $$Q(s, a) \leftarrow (1 - \alpha)Q(s, a) + \alpha\left(r + \gamma \underset{a'}{\max} Q(s', a')\right)$$
  Update state $s \leftarrow s'$
Return Q

---

Simulation

As an example, here are the results of a simulation of the above model using the following set of parameters. Some parameters values below were picked to optimize the learning process and the results via grid search.

- 2 products A and B with purchasing thresholds $T_A=7$ and $T_B=25$ respectively. These can represents the max number of periods the customer can go without purchasing a given product. In particular, we wanted the 2 products to have distinct purchase frequencies: 7 days max for the first item (e.g., milk), and 25 days max for the other (e.g., toothpaste) to highlight the model's ability to learn different purchasing behaviors.
- $\theta=4.95$. This can represent the sensitivity of the customer to the promotion. This example value was chosen to indicate that the customer is fairly sensitive to the promotion (e.g., to make the simulation interesting).
- $\phi_p \in \{0, 0.1, 0.2\}$. This variable can indicate the strength of the promotion for product p to the customer. In this example, we can restrict $\phi_p$ to take values in $\{0, 0.1, 0.2\}$ in order to reduce the size of the state-action space.
- $\alpha=0.1$. This can be the learning rate for the model, indicating how much weight new information can be given in updating the Q-matrix (e.g., the reward for taking the given action in the current state).
- $\gamma=0.9$. This can represent the future discount, indicating how many future state rewards are counted as part of updating the current reward.
- $\epsilon=0.2$. This can represent the exploration factor, indicating what percentage of time the learner will chose a random action to "explore" rather than the action that maximizes reward.
- $\pi=\$2$. This can represent the profit per sale, indicating the positive reward given to the learner when the customer buys the product (e.g., the total reward also can include the cost of promotion).

Figure 5:
FIG. 5 sets forth an example graph illustrating an average reward per period during training, according to an embodiment.

The average reward per period during training can be plotted over 200,000 iterations, as shown in FIG. 5.

We can then use the trained model to test 50,000 iteration. Following the model's recommendation yields an average reward per period of $1.747. In some embodiments, this can compare to $1.141 for a random promotion policy, and $0.786 for a policy of not running any promotions.

Real Life Implementation

The model does not need to be plug-and-play in some embodiments, and implementing a reinforcement learning agent in a client context can require substantial adaptation to that context. For example, the algorithm implementation can be adapted to a client (e.g., a retailer) that seeks to optimize promotions targeted at the customer. In addition, the algorithm can adapt to customer behavior.

For example, in some embodiments, a potential client could be a retailer (e.g., WHOLE FOODS) with a large number of heterogeneous customers (e.g., with a general customer profiles such as mid 30s with 3 kids) and a promotion channel allowing quick iteration and feedback (e.g., email promotions for online shopping). In some embodiments, a customized client's reward function can be based on data such as an actual cost structure, profit margins per product, etc. The appropriate customer state space for client's customers and the relevant action space can be defined, while making sure the dimensionality of the learning problem does not blow up (e.g., too many states and/or actions). For example, if STARBUCKS was a potential client, with a customer being a person using STARBUCKS iPHONE app, lots of data about the customer (helping with customization) could be provided. However, in some embodiments, too much customization may be avoided so that too many states and/or actions are utilized in order to reduce the state space and make the algorithm more efficient (e.g., if we know that customer very likely won't be going back in 10 minutes, some states/actions accounting for short periods of time between purchases do not need to be used.

In some embodiments, a different reinforcement learning algorithm can be selected for the learning algorithm above based on the state/action space and the reward. For example, in the learning algorithm set forth above, a Q-learning algorithm was used. In other embodiments, other algorithms, such as a deep Q-learning algorithm, may be used. In still other embodiments, double Q-learning, delayed Q learning, or greedy GQ learning, or any combination of Q-learning, may be used.

Q-learning can be a reinforcement learning technique used in machine learning. A goal of Q-Learning can be to learn a policy, which tells an agent what action to take under what circumstances. It may not require a model of the environment and may be able to handle problems with stochastic transitions and rewards, without requiring adaptations. For any finite Markov decision process (FMDP), Q-learning may be able to find a policy that is optimal in the sense that it maximizes the expected value of the total reward over all successive steps, starting from the current state. Q-learning may identify an optimal action-selection policy for any given FMDP, given infinite exploration time and a partly-random policy. "Q" can name the function that returns the reward used to provide the reinforcement and can be said to stand for the "quality" of an action taken in a given state.

Deep Q-Learning learning may use experience replay, that uses a random sample of prior actions instead of the most recent action to proceed. This can remove correlations in the observation sequence and smooth changes in the data distribution. An iterative update can adjusts Q towards target values that are only periodically updated, further reducing correlations with the target.

More information on the various Q-learning algorithms can be found at the https web site en.wikipedia.org/wiki/Q-learning, which is herein incorporated by reference.

In some embodiments, scaling issues can be accounted for. In addition, in some embodiments, hyper-parameters of the reinforcement learning model can be tuned. For example, a model for one client (e.g., STARBUCKS) may not work well for another client (e.g., DUNCAN DONUTS).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method of using reinforcement learning to optimizing promotions, comprising:
    offering a promotion to a plurality of customers for a product and/or a service during a first time period by using a reinforcement machine learning model with a sensitivity parameter;
    observing each customer's reaction;
    collecting a reward or a penalty based on each customer's reaction, wherein the reward or a penalty is a feedback to the reinforcement machine learning model, such that the feedback provides an iterative update to the reinforcement machine learning model;
    estimating, via a Bernoulli distribution, a second time period during which each customer purchases the product and/or the service, wherein the Bernoulli distribution is based on at least a ratio of time since each customer last purchased the product and/or the service and a maximum time each customer can go without purchasing the product and/or the service;
    automatically adapting the reinforcement machine learning model, without using training data, based on the feedback and the second time period to optimize the timing of the promotion;
    tuning hyperparameters of the reinforcement machine learning model based on a specific product and/or service, wherein the reinforcement machine learning model is based on experience replay that uses a random sample of prior states to remove correlations in an observation sequence of the states and smooth changes in data distribution of the model; and presenting a promotion for the product and/or the service based on the optimized timing.

2. The method of claim 1, wherein training data and/or knowledge of each customer's historical buying activity is not required.

3. The method of claim 1, wherein the promotion is a discount.

4. The method of claim 1, wherein the promotion is a non-discount promotion.

5. The method of claim 1, wherein the promotion is a coupon, advertisement, or recommendation, or any combination thereof.

6. The method of claim 1, wherein a time dimension is utilized in the reinforcement machine learning model so that the promotion and/or the timing can be optimized.

7. The method of claim 1, wherein ultra-personalization of the promotion and/or the timing of the promotion is done.

8. The method of claim 1, wherein the promotion relates to a consumption pattern of regularly consumed products.

9. The method of claim 1, wherein an impact of the promotion can be determined as $t_p$ varies.

10. The method of claim 1, wherein the product is a regularly consumed product.

11. The method of claim 1, wherein a Q-learning algorithm is used in the reinforcement learning model.

12. The method of claim 1, wherein a deep Q-learning algorithm is used in the reinforcement learning model.

13. The method of claim 1, wherein a double Q-learning algorithm is used in the reinforcement learning model.

14. The method of claim 1, wherein a delayed Q-learning algorithm is used in the reinforcement learning model.

15. The method of claim 1, wherein a greedy Q-learning algorithm is used in the reinforcement learning model.

16. The method of claim 1, wherein the promotion comprises a weak promotion and/or a strong promotion.

17. The method of claim 1, wherein flexible modeling parameters are used in the reinforcement machine learning model.

18. The method of claim 1, wherein the Bernoulli distribution is further based on at least one of a sensitivity of the customer to promotion/ads related to the product and/or the service, and a strength of the promotion/ad for the product and/or the service for the customer.

19. A system using reinforcement learning to optimizing promotions, comprising:
a processor configured for:
offering a promotion to a plurality of customers for a product and/or a service during a first time period by using a reinforcement machine learning model with a sensitivity parameter;
observing each customer's reaction;
collecting a reward or a penalty based on each customer's reaction, wherein the reward or a penalty is a feedback to the reinforcement machine learning model, such that the feedback provides an iterative update to the reinforcement machine learning model;
estimating, via a Bernoulli distribution, a second time period during which each customer purchases the product and/or the service, wherein the Bernoulli distribution is based on at least a ratio of a time since each customer last purchased the product and/or the service and a maximum time each customer can go without purchasing the product and/or the service;
automatically adapting the reinforcement machine learning model, without using training data or user input, based on the reward and the second time period or the penalty and the second time period to optimize a timing of the promotion;
tuning hyperparameters of the reinforcement machine learning model based on a specific product and/or service, wherein the reinforcement machine learning model is based on experience replay that uses a random sample of prior states to remove correlations in the an observation sequence of the states and smooth changes in data distribution of the model; and
presenting a promotion for the product and/or the service based on the optimized timing.

20. The system of claim 19, wherein the promotion is a discount and/or a non-discount promotion.

21. The system of claim 19, wherein the promotion is a coupon, advertisement, or recommendation, or any combination thereof.

22. The system of claim 19, wherein a time dimension is utilized in the reinforcement machine learning model so that the promotion and/or the timing can be optimized.

23. The system of claim 19, wherein ultra-personalization of the promotion and/or the timing of the promotion is done.

24. The system of claim 19, wherein the promotion relates to a consumption pattern of regularly consumed products.

25. The system of claim 19, wherein an impact of the promotion can be determined as $t_p$ varies.

26. The system of claim 19, wherein a Q-learning algorithm is used in the reinforcement learning model.

27. The system of claim 26, wherein the Q-learning algorithm comprises: a deep Q-learning algorithm; a double Q-learning algorithm; a delayed Q-learning algorithm; or a greedy Q-learning algorithm; or any combination thereof.

28. The system of claim 19, wherein the promotion comprises a weak promotion and/or a strong promotion.

29. The system of claim 19, wherein flexible modeling parameters are used in the reinforcement machine learning model.

30. The system of claim 19, wherein the Bernoulli distribution is further based on at least one of a sensitivity of the customer to promotion/ads related to the product and/or the service, and a strength of the promotion/ad for the product and/or the service for the customer.

* * * * *